(12) United States Patent
Ito

(10) Patent No.: US 7,779,623 B2
(45) Date of Patent: Aug. 24, 2010

(54) EXHAUST GAS PURIFICATION APPARATUS FOR INTERNAL COMBUSTION ENGINE

(75) Inventor: Takekazu Ito, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 550 days.

(21) Appl. No.: 11/887,011

(22) PCT Filed: Dec. 28, 2006

(86) PCT No.: PCT/JP2006/326404
§ 371 (c)(1),
(2), (4) Date: Sep. 24, 2007

(87) PCT Pub. No.: WO2007/077973
PCT Pub. Date: Jul. 12, 2007

(65) Prior Publication Data
US 2009/0031707 A1 Feb. 5, 2009

(30) Foreign Application Priority Data
Dec. 28, 2005 (JP) ............................. 2005-378047

(51) Int. Cl.
*F01N 3/00* (2006.01)
(52) U.S. Cl. ............................. 60/286; 60/295; 60/297; 60/301; 60/303
(58) Field of Classification Search .................. 60/280, 60/285, 286, 295, 297, 301, 303
See application file for complete search history.

(56) References Cited
U.S. PATENT DOCUMENTS

| | | | | |
|---|---|---|---|---|
| 4,770,148 | A * | 9/1988 | Hibino et al. ................ | 123/491 |
| 5,950,419 | A * | 9/1999 | Nishimura et al. ............. | 60/274 |
| 6,021,639 | A | 2/2000 | Abe et al. | |
| 6,023,930 | A | 2/2000 | Abe et al. | |
| 6,345,499 | B1 * | 2/2002 | Nishimura et al. ............. | 60/277 |
| 6,871,489 | B2 * | 3/2005 | Tumati et al. .................. | 60/285 |

(Continued)

FOREIGN PATENT DOCUMENTS

JP    A-09-013946    1/1997

(Continued)

*Primary Examiner*—Binh Q Tran
(74) *Attorney, Agent, or Firm*—Oliff & Berridge, PLC

(57) ABSTRACT

In an exhaust gas purification apparatus for an internal combustion engine, a technique is provided which makes it possible to recover an exhaust gas purification ability more efficiently than ever. In the exhaust gas purification apparatus for an internal combustion engine which recovers an exhaust gas purification ability of a filter by supplying fuel to the filter that is arranged on an exhaust passage of the internal combustion engine for purifying an exhaust gas, in case where the exhaust gas purification ability of the filter is to be recovered, the supply of fuel is executed so as to make the degree of fuel atomization relatively low, as shown in (b), when the temperature of an exhaust gas flowing into the filter is in a first predetermined range, and when the temperature of the filter is in a second predetermined range, whereas the supply of fuel is executed so as to make the degree of fuel atomization relatively high, as shown in (a), when the temperature of the exhaust gas flowing into the filter is lower than a lower limit temperature of the first predetermined range, or when the temperature of the filter is higher than an upper limit temperature of the second predetermined range.

2 Claims, 3 Drawing Sheets

U.S. PATENT DOCUMENTS

| | | | |
|---|---|---|---|
| 7,032,376 B1 * | 4/2006 | Webb et al. | 60/297 |
| 7,367,182 B2 * | 5/2008 | Takahashi et al. | 60/286 |
| 7,581,386 B2 * | 9/2009 | Ranalli et al. | 60/286 |

FOREIGN PATENT DOCUMENTS

| | | |
|---|---|---|
| JP | A-09-228869 | 9/1997 |
| JP | A-2000-240429 | 9/2000 |
| JP | A-2001-041025 | 2/2001 |
| JP | A-2002-038939 | 2/2002 |
| JP | A-2002-038942 | 2/2002 |

* cited by examiner (a)

(b)

(a)

(b)

US 7,779,623 B2

EXHAUST GAS PURIFICATION APPARATUS FOR INTERNAL COMBUSTION ENGINE

TECHNICAL FIELD

The present invention relates to an exhaust gas purification apparatus for an internal combustion engine capable of purifying an exhaust gas discharged from the internal combustion engine by removing harmful components in the exhaust gas.

BACKGROUND ARTS

In general, internal combustion engines are controlled such that before an amount of NOx occlusion of a NOx storage reduction catalyst (hereinafter referred to as a NOx catalyst) arranged in an exhaust passage reaches a critical value, the flow rate of intake air is reduced and fuel is added to the exhaust passage, whereby the NOx occluded in the NOx catalyst is released and reduced, thus recovering the NOx occlusion capacity of the NOx catalyst. Such control is called NOx reduction processing.

In Japanese patent application laid-open No. 2002-38939, there is disclosed a technique in which when fuel is added in NOx reduction processing, etc., the flow rate of an exhaust gas, the temperature thereof, and the temperature of an inner wall of an exhaust passage are detected or estimated, so that an amount of evaporation of the added fuel (i.e., an amount of fuel atomization) is estimated based on these parameters, and the amount and timing of fuel addition are decided in consideration of the evaporation amount.

In addition, in Japanese patent application laid-open No. H9-228869, there is disclosed a technique in which when an internal combustion engine is operated with a rich air fuel ratio for a specific cylinder and a lean air fuel ratio for the other cylinders, the width of a fuel injection pulse for the rich cylinder is divided into a plurality of segments so that a spray of fuel having large particle sizes in an initial period of fuel injection is supplied to generate a lot of HC and CO to decrease the degree of richness of a mixture, thereby reducing a difference in output power between the rich cylinder and the lean cylinders.

In Japanese patent application laid-open No. 2001-41025, there is disclosed a technique in which during increase of a reducing agent supplied to a catalyst, which is disposed in an exhaust passage of an engine for reducing a NOx in an exhaust gas by means of the reducing agent, the increase of the reducing agent is temporarily suppressed when the degree of NOx reduction detected becomes a predetermined value or less.

DISCLOSURE OF THE INVENTION

The object of the present invention is to provide a technique which can recover an exhaust gas purification ability more efficiently than ever in an exhaust gas purification apparatus for an internal combustion engine.

In the present invention, the following construction is adopted. That is, an exhaust gas purification apparatus for an internal combustion engine is provided which recovers an exhaust gas purification ability of an exhaust gas purification unit by supplying fuel to said exhaust gas purification unit that is arranged on an exhaust passage of the internal combustion engine for purifying an exhaust gas, wherein in case where the exhaust gas purification ability of said exhaust gas purification unit is to be recovered, when the temperature of an exhaust gas flowing into said exhaust gas purification unit is in a first predetermined range, and when the temperature of said exhaust gas purification unit is in a second predetermined range, the supply of fuel is executed in such a manner that the degree of fuel atomization is made relatively low, and when the temperature of the exhaust gas flowing into said exhaust gas purification unit is lower than a lower limit of said first predetermined range, or when the temperature of said exhaust gas purification unit is higher than an upper limit temperature of said second predetermined range, the supply of fuel is executed so as to make the degree of fuel atomization relatively high.

The temperature of the exhaust gas in the first predetermined range and the temperature of the exhaust gas purification unit in the second predetermined range in the present invention are temperature ranges, respectively, in which the exhaust gas purification ability of the exhaust gas purification unit can be suitably recovered even if the degree of atomization of the fuel to be supplied when the exhaust gas purification ability of the exhaust gas purification unit is to be recovered is relatively low.

According to this construction, in the case of the exhaust gas purification ability of the exhaust gas purification unit being recovered, when the temperature of the exhaust gas is in the first predetermined range, and when the temperature of the exhaust gas purification unit is in the second predetermined range, the degree of atomization of the supplied fuel is made relatively low, so a relatively large amount of fuel will reach the exhaust gas purification unit in a short period of time. As a result, a chemical reaction in the exhaust gas purification unit to recover the exhaust gas purification ability of the exhaust gas purification unit is executed at an earlier time. Accordingly, the exhaust gas purification ability of the exhaust gas purification unit can be recovered at an earlier time.

On the other hand, in case where the temperature of the exhaust gas is lower than a lower limit temperature of the first predetermined range upon recovery of the exhaust gas purification ability of the exhaust gas purification unit, it becomes difficult for the supplied fuel to perform chemical reaction in the exhaust gas purification unit if the degree of atomization of the supplied fuel is relatively low. Therefore, there is fear that the supplied fuel might escape through the exhaust gas purification unit without performing chemical reaction.

According to the construction of the present invention, when the temperature of the exhaust gas is lower than the lower limit temperature of the first temperature range, the degree of atomization of fuel to be added is made relatively high. As a result, a greater amount of fuel can be used for the chemical reaction to recover the exhaust gas purification ability of the exhaust gas purification unit. Therefore, it is possible to suppress the supplied fuel from escaping through the exhaust gas purification unit without performing chemical reaction.

In addition, in the case of the exhaust gas purification ability of the exhaust gas purification unit being recovered, when the temperature of the exhaust gas purification unit is higher than the upper limit temperature of the second predetermined range, it becomes easy for the supplied fuel to perform chemical reaction in the exhaust gas purification unit. Therefore, there is fear that when an excessive amount of fuel reaches the exhaust gas purification unit in a short period of time, the temperature of the exhaust gas purification unit might excessively rise.

According to the construction of the present invention, when the temperature of the exhaust gas purification unit is higher than the upper limit temperature of the second predetermined range, the degree of atomization of the supplied fuel is made relatively high. Accordingly, the fuel will gradually reach the exhaust gas purification unit. Therefore, it is possible to suppress an excessive rise in temperature of the exhaust gas purification unit.

Thus, with this construction, the exhaust gas purification ability in the exhaust gas purification apparatus for an internal combustion engine can be recovered more efficiently by changing the degree of atomization of fuel to be supplied in accordance with a situation thereof.

Moreover, it is preferable to make the degree of atomization of fuel relatively high by intermittently performing the supply of a predetermined amount of fuel that is divided into a plurality of times, in one supply period performing the supply of the predetermined amount of fuel and having a fuel supply non-execution period that is a period in which fuel is not supplied.

According to this construction, the degree of atomization of fuel can be made relatively high with a simple construction, thus making it possible to achieve a change in the degree of atomization of fuel more easily.

According to the present invention, in the exhaust gas purification apparatus for an internal combustion engine, it is possible to recover the exhaust gas purification ability in a more efficient manner.

DESCRIPTION OF THE PREFERRED EMBODIMENT

Hereinafter, reference will be made to a specific embodiment of the present invention.

Embodiment 1

Figure 1:
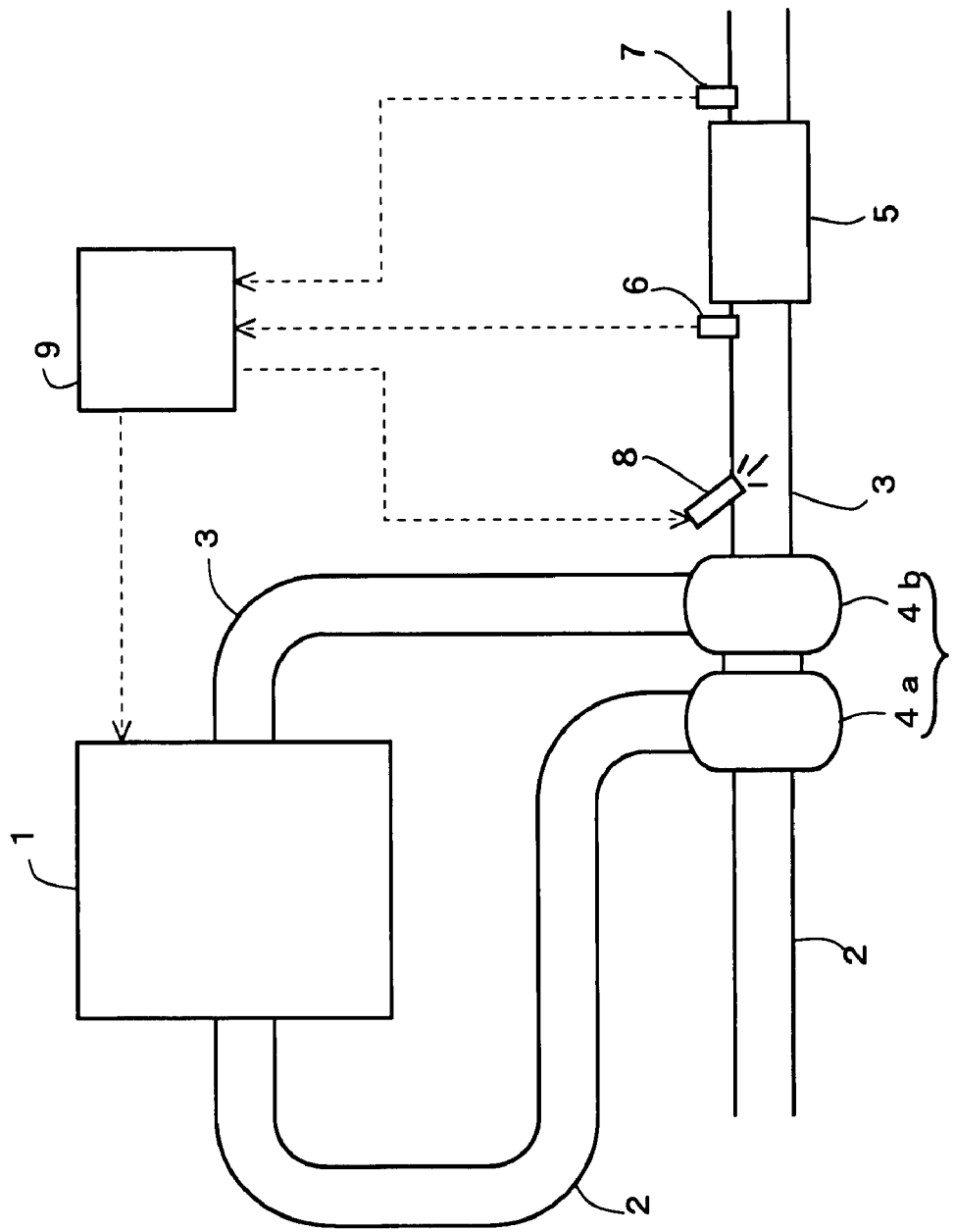
FIG. 1 is a view showing the schematic construction of an internal combustion engine with its intake system and exhaust system to which an exhaust gas purification apparatus is applied according to a first embodiment of the present invention.

In a first embodiment, reference will be made to a case where the present invention is applied to an engine for driving a vehicle. FIG. 1 is a view showing the schematic construction of an internal combustion engine with its intake system and exhaust system according to this embodiment.

The internal combustion engine 1 as shown in FIG. 1 is a water-cooled four-stroke cycle diesel engine having four in-line cylinders 2.

An intake passage 2 and an exhaust passage 3 are connected with the internal combustion engine 1. A compressor 4a of a turbocharger (supercharger) 4 is installed on an intermediate portion of the intake passage 2. On the other hand, a turbine 4b of the turbocharger 4 is installed on an intermediate portion of the exhaust passage 3. The turbine 4b is driven by an exhaust gas flowing in the exhaust passage 3, and the compressor 4a is caused to rotate together with the turbine 4b thus driven to supercharge intake air flowing in the intake passage 2.

A filter 5 for purifying an exhaust gas discharged from each cylinder of the internal combustion engine 1 is arranged in the exhaust passage 3 at a location downstream of the turbine 4b. Here, note that the filter 5 traps particulate matter (hereinafter referred to as PM) discharged from the internal combustion engine 1. A NOx storage reduction catalyst (hereinafter referred to as a NOx catalyst) is supported by the filter 5. In this embodiment, the filter 5 corresponds to an exhaust gas purification unit of the present invention.

A first temperature sensor 6 is disposed at a location immediately upstream of the filter 5, so that the temperature of an incoming exhaust gas flowing into the filter is detected by the first temperature sensor 6. In this embodiment, a second temperature sensor 7 is disposed immediately downstream of the filter 5.

A fuel addition nozzle 8 for adding fuel to the exhaust gas flowing in the exhaust passage 3 is disposed in the exhaust passage 3 at a location downstream of the turbine 4b and upstream of the filter 5. The fuel addition nozzle 8 corresponds to a fuel addition unit of the present invention.

An electronic control unit (ECU) 9 for controlling the internal combustion engine 1 is provided in conjunction with the internal combustion engine 1 as constructed in the above manner. The ECU 9 is in the form of a control computer comprising a CPU, a ROM, a RAM, a backup RAM, etc.

The first and second temperature sensors 6, 7, etc., are electrically connected to the ECU 9, so that the output signals of these sensors are input to the ECU 9. The ECU 9 estimates the temperature of the filter 5 from the output value of the second temperature sensor 7.

A fuel injection valve, the fuel addition nozzle 8 and the like of the internal combustion engine 1 are electrically connected to the ECU 9, so that the fuel injection valve, the fuel addition nozzle 8 and the like are controlled by the ECU 9.

In addition, the ECU 9 executes the addition of fuel by using the fuel addition nozzle 8 in accordance with programs stored in the ROM.

Here, note that the addition of fuel means that fuel is added from the fuel addition nozzle 8 to the exhaust gas in the exhaust passage 3 at the time of processing to recover the exhaust gas purification ability of the filter 5. As the processing to recover the exhaust gas purification ability of the filter 5, there are enumerated NOx reduction processing, SOx poisoning recovery processing, PM oxidation removal processing, etc.

Also, note that the NOx reduction processing is the processing that adds fuel from the fuel addition nozzle 8 to the exhaust gas to enrich the air fuel ratio of the exhaust gas flowing into the NOx catalyst carried by the filter 5, thereby releasing and reducing the NOx occluded in the NOx catalyst. The SOx poisoning recovery processing is the processing that adds fuel from the fuel addition valve 8 to the exhaust gas to oxidize the added fuel in the NOx catalyst carried by the filter 5, whereby the temperature of the filter 5 is raised due to the heat generated upon the oxidation, and at the same time, the air fuel ratio of the exhaust gas flowing into the NOx catalyst carried by the filter 5 is enriched, thereby releasing and reducing the SOx occluded in the NOx catalyst. The PM oxidation removal processing is the processing that raises the temperature of the filter 5 by adding fuel from the fuel addition nozzle 8 to the exhaust gas, similar to the SOx poisoning recovery processing, to oxidize and remove the PM trapped in the filter 5.

In the NOx reduction processing, the SOx poisoning recovery processing and the PM oxidation removal processing as stated above, the addition of fuel from the fuel addition nozzle 8 is executed in each fuel addition period of a predetermined time that has a fuel addition non-execution period in which the addition of fuel is not executed. There is fear that the temperature of the filter 5 might excessively rise if the addition of fuel from the fuel addition nozzle 8 is continuously executed for a long period of time without the provision of any fuel addition non-execution period in the fuel addition period. Accordingly, the excessive temperature rise of the filter 5 is suppressed by executing the addition of fuel in each fuel addition period having a fuel addition non-execution period, as stated above.

In addition, in this embodiment, the degree of atomization of the fuel added from the fuel addition nozzle 8 is changed in accordance with a situation in the fuel addition. That is, a change between a case in which fuel is added so as to provide a relatively higher degree of atomization and a case in which fuel is added so as to provide a relatively lower degree of atomization is made in accordance with the situation thereof. Here, the degree of atomization of fuel represents the level of the particle size of the added fuel, and the higher the degree of atomization of fuel, the smaller the particle size of the fuel becomes.

In this embodiment, the degree of atomization of the fuel added from the fuel addition nozzle 8 is changed by changing the number of frequency of addition of fuel. That is, when the degree of atomization of the fuel to be added is made relatively low, a predetermined amount of fuel to be added in one fuel addition period is continuously added from the fuel addition nozzle 8. Hereinafter, such fuel addition is referred to as continuous fuel addition. On the other hand, when the degree of atomization of the fuel to be added is made relatively high, the predetermined amount of fuel to be added in one fuel addition period is intermittently added from the fuel addition nozzle 8 while being divided into four times in the fuel addition period. Hereinafter, such fuel addition is referred to as intermittent fuel addition.

According to this, the degree of atomization of fuel can be changed with a much simpler construction.

Figure 2:
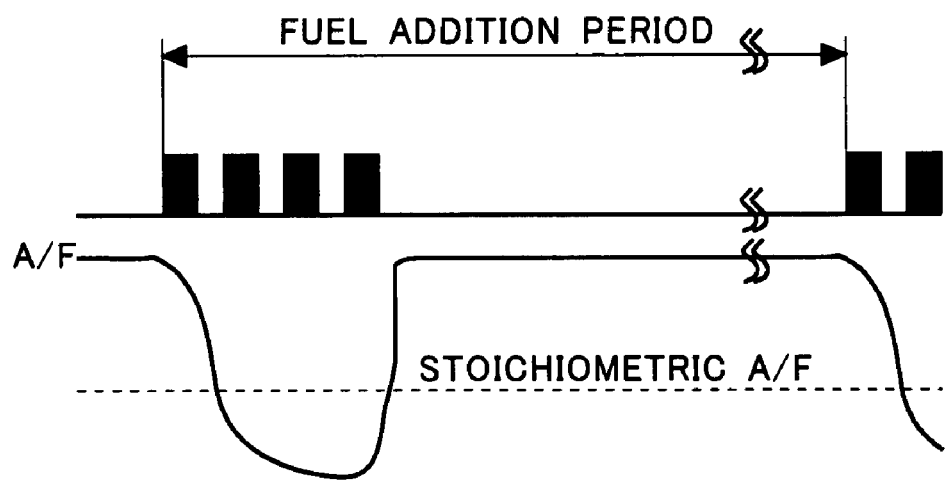
FIG. 2 is a timing chart of the addition of fuel in NOx reduction processing according to the first embodiment, wherein (a) is in the case of intermittent addition of fuel, and (b) is in the case of continuous addition of fuel.
Figure 2:
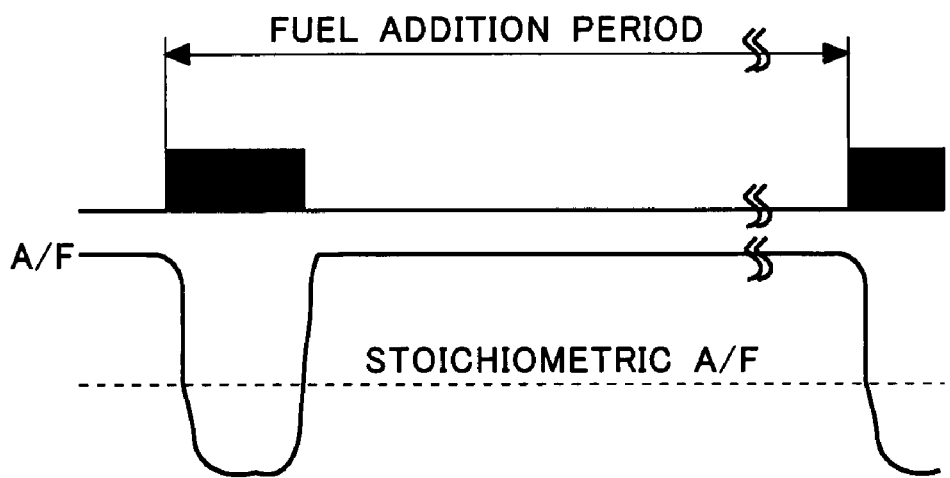

Here, reference will be made to the addition of fuel at the time of NOx reduction processing based on a timing chart as shown in FIG. 2. (a) in FIG. 2 shows one addition period in the case of intermittent fuel addition, and (b) in FIG. 2 shows one addition period in the case of continuous fuel addition. Here, note that in the NOx reduction processing, in order to release and reduce the NOx occluded in the NOx catalyst, the addition of fuel is performed to shift an A/F (air fuel ratio) of a mixture indicated by a solid line to a target air fuel ratio which is richer than a stoichiometric value (stoichiometric air fuel ratio) indicated by a broken line.

Specifically, when the temperature of the exhaust gas flowing into the filter 5, which is detected by the first temperature sensor 6, is in a first temperature range and when the temperature of the filter 5 estimated from an output value of the second temperature sensor 7 is in a second temperature range in the case of the NOx reduction processing requirement condition being satisfied, the continuous addition of fuel as shown in (b) in FIG. 2 is performed in such a manner that the addition of fuel is executed so as to make the degree of atomization of fuel relatively low.

Here, note that the temperature of the exhaust gas in the first temperature range and the temperature of the filter 5 in the second temperature range in the NOx reduction processing are in temperature ranges, respectively, in which the NOx occluded in the NOx catalyst can be released and reduced in an appropriate manner even if the degree of atomization of the fuel added from the fuel addition nozzle 8 is relatively low when the NOx occluded in the NOx catalyst carried by the filter 5 is to be released and reduced.

When the temperature of the exhaust gas is in the first temperature range and when the temperature of the filter 5 is in the second temperature range, the degree of atomization of the added fuel is made relatively low, so a relatively large amount of fuel will reach the filter 5 in a short period of time. Thus, as shown in (b) in FIG. 2, the A/F can be shifted to the target air fuel ratio at an earlier time than when the intermittent addition of fuel is performed, as shown in (a) in FIG. 2. Accordingly, the release and reduction of the NOx occluded in the NOx catalyst in the filter 5 to recover the exhaust gas purification ability of the filter 5 can be executed at an earlier time, so the NOx reduction processing can be completed at an earlier time.

On the other hand, when the temperature of the exhaust gas flowing into the filter 5, which is detected by the first temperature sensor 6, is lower than a lower limit temperature of the first temperature range in the case of the NOx reduction processing requirement condition being satisfied, the intermittent addition of fuel as shown in (a) in FIG. 2 is performed so that the addition of fuel is executed so as to make the degree of atomization of fuel relatively high.

Here, in case where the temperature of the exhaust gas is lower than the lower limit temperature of the first temperature range, it is difficult for fuel to vaporize and atomize when the degree of atomization of the added fuel is relatively low, so it becomes difficult for the fuel to release and reduce the NOx occluded in the NOx catalyst in the filter 5. Therefore, there is fear that the added fuel might escape through the NOx catalyst without being used for releasing and reducing the NOx occluded in the NOx catalyst.

However, in this embodiment, when the temperature of the exhaust gas is lower than the lower limit temperature of the first temperature range, the degree of atomization of fuel to be added is made relatively high, so fuel is relatively easy to vaporize and atomize, and a greater amount of fuel is used for release and reduction of the NOx occluded in the NOx catalyst. Accordingly, a greater amount of fuel can be used for releasing and reducing the NOx occluded in the NOx catalyst to recover the NOx occlusion capacity of the NOx catalyst, so it is possible to suppress the added fuel from escaping through the NOx catalyst without being used for releasing and reducing the NOx occluded in the NOx catalyst.

In addition, in case where the NOx reduction processing requirement condition is satisfied, the intermittent addition of fuel as shown in (a) in FIG. 2 is performed when the temperature of the filter 5 estimated from the output value of the second temperature sensor 7 is higher than an upper limit value of the second temperature range, so that the addition of fuel is executed so as to make the degree of atomization of fuel relatively high.

Here, when the temperature of the filter 5 is higher than the upper limit temperature of the second temperature range, it becomes easy for the added fuel to be used for releasing and reducing the NOx occluded in the NOx catalyst in the filter 5. Therefore, when a large amount of fuel reaches the filter 5 in a short period of time at a time, there is fear that the release and reduction of the NOx occluded in the NOx catalyst might be facilitated to excessively raise the temperature of the filter 5 due to the generation of heat according to the reaction.

However, in this embodiment, when the temperature of the filter 5 is higher than the upper limit temperature of the second temperature range, the degree of atomization of fuel to be added is made relatively high, so the fuel will gradually reach the filter 5. Accordingly, the release and reduction of the NOx occluded in the NOx catalyst can be suppressed, and the generation of heat according to the reaction can also be suppressed, whereby it is possible to suppress an excessive rise in temperature of the filter 5.

Figure 3:
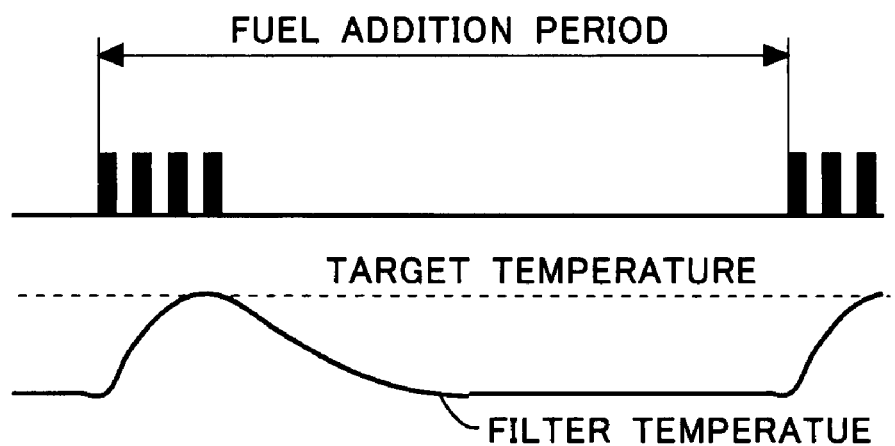
FIG. 3 is a timing chart of the addition of fuel in PM oxidation removal processing according to the first embodiment, wherein (a) is in the case of intermittent addition of fuel, and (b) is in the case of continuous addition of fuel.
Figure 3:
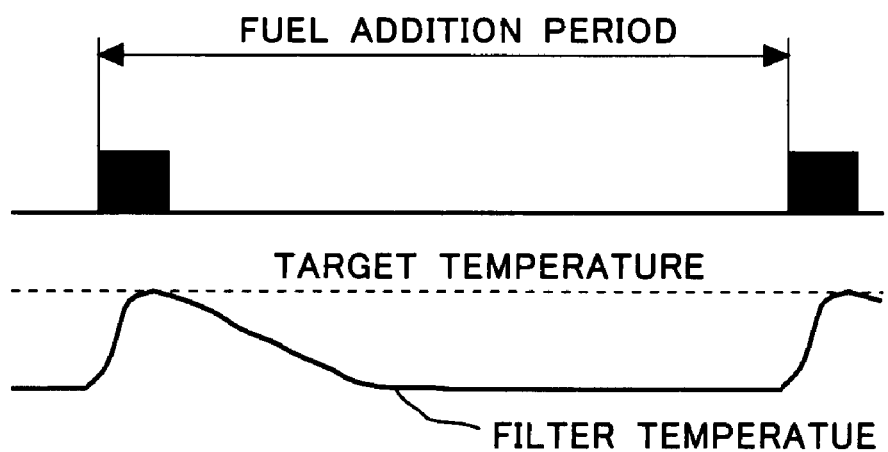

Here, reference will be made to the addition of fuel at the time of PM oxidation removal processing based on a timing chart as shown in FIG. 3. (a) in FIG. 3 shows one addition period in the case of intermittent fuel addition, and (b) FIG. 3 shows one addition period in the case of continuous fuel addition. Here, note that in the PM oxidation removal processing, the addition of fuel is performed so as to make the temperature of the filter 5 indicated by a solid line reach a target temperature of a broken line by means of the oxidation reaction of fuel on the NOx catalyst carried by the filter 5. Also, in the SOx poisoning recovery processing, the addition of fuel is performed for a similar purpose.

Specifically, when the temperature of the exhaust gas flowing into the filter 5, which is detected by the first temperature sensor 6, is in a third temperature range and when the temperature of the filter 5 estimated from the output value of the second temperature sensor 7 is in a fourth temperature range in the case of a PM oxidation removal processing requirement condition being satisfied, the continuous addition of fuel as shown in (b) in FIG. 3 is performed in such a manner that the addition of fuel is executed so as to make the degree of atomization of fuel relatively low.

Here, note that the temperature of the exhaust gas in the third temperature range and the temperature of the filter 5 in the fourth temperature range in the PM oxidation removal processing are in temperature ranges, respectively, in which fuel can be oxidized on the NOx catalyst in an appropriate manner even if the degree of atomization of the fuel added from the fuel addition nozzle 8 is relatively low when fuel is oxidized on the NOx catalyst carried by the filter 5.

When the temperature of the exhaust gas is in the third temperature range and when the temperature of the filter 5 is in the fourth temperature range, the degree of atomization of the added fuel is made relatively low, so a relatively large amount of fuel will reach the filter 5 in a short period of time. As a result, the oxidation reaction of fuel is executed at an early time on the NOx catalyst carried by the filter 5, whereby the temperature of the filter 5 can be raised in an earlier time, as shown in (b) in FIG. 3, than when the intermittent addition of fuel is performed, as shown in (a) in FIG. 3. Accordingly, the temperature raising of the filter 5 can be performed at an earlier time, so the PM oxidation removal processing can also be started at an earlier time, and hence the PM oxidation removal processing can be completed at an accordingly earlier time.

On the other hand, when the temperature of the exhaust gas flowing into the filter 5, which is detected by the first temperature sensor 6, is lower than a lower limit temperature in the third temperature range in the case of the PM oxidation removal processing requirement condition being satisfied, the intermittent addition of fuel as shown in (a) in FIG. 3 is performed so that the addition of fuel is executed so as to make the degree of atomization of fuel relatively high.

Here, in case where the temperature of the exhaust gas is lower than the lower limit temperature of the third temperature range, it is difficult for fuel to vaporize and atomize when the degree of atomization of the added fuel is relatively low, so it becomes difficult for the fuel to perform oxidation reaction on the NOx catalyst, and the generation of heat according to the reaction becomes difficult to occur. As a result, there is fear that the added fuel might escape through the NOx catalyst without being used for the oxidation reaction on the NOx catalyst.

However, in this embodiment, when the temperature of the exhaust gas is lower than the lower limit temperature of the third temperature range, the degree of atomization of fuel to be added is made relatively high, so fuel is relatively easy to vaporize and atomize, and a greater amount of fuel is used for oxidation reaction on the NOx catalyst. As a result, a greater amount of fuel can be used for the oxidation reaction on the NOx catalyst so as to recover a PM trap ability of the filter 5, so it is possible to suppress the added fuel from escaping through the NOx catalyst without being used for the oxidation reaction on the NOx catalyst.

In addition, in case where the NOx reduction processing requirement condition is satisfied, the intermittent addition of fuel as shown in (a) in FIG. 3 is performed when the temperature of the filter 5 estimated from the output value of the second temperature sensor 7 is higher than an upper limit value of a fourth temperature range, so that the addition of fuel is executed so as to make the degree of atomization of fuel relatively high.

Here, when the temperature of the filter 5 is higher than the upper limit temperature of the fourth temperature range, it becomes easy for the added fuel to be used for the oxidation reaction on the NOx catalyst in the filter 5. Therefore, when a large amount of fuel reaches the filter 5 in a short period of time at a time, there is fear that the oxidation reaction of the fuel on the NOx catalyst might be facilitated to excessively raise the temperature of the filter 5 due to the generation of heat according to the reaction.

However, in this embodiment, when the temperature of the filter 5 is higher than the upper limit temperature of the fourth temperature range, the degree of atomization of fuel to be added is made relatively high, so the fuel will gradually reach the filter 5. As a result, the oxidation reaction of fuel on the NOx catalyst can be suppressed, and the generation of heat according to the reaction can also be suppressed, whereby it is possible to suppress an excessive rise in temperature of the filter 5.

As described in the foregoing, in this embodiment, the exhaust gas purification ability of the filter 5 can be recovered more efficiently by performing the addition of fuel while changing the degree of atomization in accordance with the situation thereof.

In addition, in this embodiment, the fuel addition nozzle 8 is disposed at a location downstream of the turbine 4b, so the fuel added from the fuel addition nozzle 8 is not stirred with the exhaust gas by the turbine 4b, as a result of which an advantageous effect on the filter 5 due to changing the degree of atomization of fuel upon addition of the fuel is generated to a more remarkable extent.

Here, the first temperature range and the third temperature range in the above-mentioned embodiment correspond to a first predetermined range of the present invention, and the second temperature range and the fourth temperature range in the above-mentioned embodiment correspond to a second predetermined range of the present invention.

In the above-mentioned embodiment, an example of changing the degree of atomization of fuel by changing the frequency of fuel addition has been presented, but for example, there may be employed a technique that uses, by changing, fuel addition nozzles which have varying diameters of injection holes through which fuel is added, or a technique that changes the injection pressure of fuel to be added, or the like, and the degree of atomization of fuel may need be changed, so cases using these techniques are included in the present invention. Moreover, in the above-mentioned embodiment, it is constructed such that fuel is added from the fuel addition nozzle to the exhaust gas, but the present invention is not limited to this, and may be achieved by auxiliary injection inside the internal combustion engine, etc.

The invention claimed is:

1. An exhaust gas purification apparatus for an internal combustion engine which recovers an exhaust gas purification ability of an exhaust gas purification unit by supplying fuel to said exhaust gas purification unit that is arranged on an exhaust passage of the internal combustion engine for purifying an exhaust gas, wherein in case where the exhaust gas purification ability of said exhaust gas purification unit is to be recovered, when the temperature of the exhaust gas flowing into said exhaust gas purification unit is in a first predetermined range, and when the temperature of said exhaust gas purification unit is in a second predetermined range, the supply of fuel is executed so as to make the degree of fuel atomization relatively low; and when the temperature of the exhaust gas flowing into said exhaust gas purification unit is lower than a lower limit temperature of said first predetermined range, or when the temperature of said exhaust gas purification unit is higher than an upper limit temperature of said second predetermined range, the supply of fuel is executed so as to make the degree of fuel atomization relatively high.

2. The exhaust gas purification apparatus for an internal combustion engine as set forth in claim 1, wherein the degree of atomization of the fuel is made relatively high by intermittently performing the supply of a predetermined amount of fuel that is divided into a plurality of times, in one supply period performing the supply of the predetermined amount of fuel and having a fuel supply non-execution period that is a period in which fuel is not supplied.

* * * * *